Jan. 26, 1965     G. L. WIEBER     3,166,769

METHOD AND APPARATUS FOR HEADING A FASTENER

Filed Feb. 28, 1962     2 Sheets-Sheet 1

PRIOR ART

INVENTOR.
GEORGE L. WIEBER
BY Robert E. Silver
ATTORNEY

Jan. 26, 1965  G. L. WIEBER  3,166,769

METHOD AND APPARATUS FOR HEADING A FASTENER

Filed Feb. 28, 1962  2 Sheets-Sheet 2

INVENTOR.
GEORGE L. WIEBER
BY
ATTORNEY

United States Patent Office 3,166,769
Patented Jan. 26, 1965

3,166,769
METHOD AND APPARATUS FOR HEADING
A FASTENER
George L. Wieber, Mount Prospect, Ill., assignor to Illinois Tool Works Inc., Chicago, Ill., a corporation of Delaware
Filed Feb. 28, 1962, Ser. No. 176,332
4 Claims. (Cl. 10—10)

This invention relates in general to heading of fasteners, and more particularly relates to an improvement in the method and apparatus for cold heading a fastener such as a screw, bolt and the like.

In the prior art cold heading process for providing a large diameter flat head having a cross recess therein on the end of a fastener blank, for example a screw fastener blank, several problems are encountered when it is desired to make the flat head with a diameter in excess of two and one half times the size of the wire stock used to form the fastener. These problems are put into particular focus when the heading operation includes the placement of a relatively deep and large cross recess in the head for later engagement by a torque imparting tool. In some applications of a flat head fastener, it is not required that the head be perfectly circular and the prior art fastener heads are adequate. However, in other applications such as for example, the application of screws to Gypsum wall board, it is very necessary that the rotary fastener head be made with a very uniform circular periphery which has a diameter which is very large with respect to the size of the shank. Also, it is necessary that the fastener head be made with a very thin portion at the radially outer periphery thereof. The quality of the peripheral portions of the head of a rotary fastener is very critical when used with wall board from the standpoint of not tearing the paper during the application of the screw to the wall board.

In attempting to make screws having a large flat head, thin peripheral edge and deep cross recess for use with wall board by standard prior art techniques, two major problems are encountered. First, it is very difficult to get the screw heads to fill out completely so that the heads of screws are out of circularity and have a somewhat square or rhomboid shape. The second problem is that definite nicks or indentations often appear in the periphery of the flat head (in end view) substantially in alignment with the wing portions of the cross recess in the head. This invention is concerned with a method and apparatus for manufacturing high and uniform quality large cross recessed flat headed screws wherein the head portions have a relatively large diameter so that the noted prior art defects are not present in the finished product.

More particularly, it is an object of this invention to provide a method and apparatus for providing a first stage upset blow on the end of wire stock to provide a plurality of bumps or lugs in the first blow upset for the purpose of providing and predisposing sufficient volume of material to counteract the "material sucking" tendency of a cross recess punch used in the second (finish) heading blow, said "material sucking" tendency formerly drawing in material from the first blow upset which provided defects in the finished head while forming the cross recess in the screw head.

More particularly, it is an object of this invention to provide bumps or nibs on a first stage upset of a fastener head which are aligned with the wings of a cross recess punch rather than intermediate same, and thus as the punch descends towards the material of the first stage upset, the wings draw the material from the lugs partially into the recess that is formed and extrudes material from the lugs toward the periphery of the head of the screw.

It is an object of this invention to provide bumps or nibs on a first stage upset of a fastener blank, the relative volume of which is dependent upon the speed of entering movement of the second stage punch relative to the head, the faster the speed of relative movement of the punch, the greater volume being needed in the bumps or nibs.

It is a further object of this invention to provide a method of manufacturing a screw head which eliminates nicks in the finally formed article which would be present by the use of prior art types of techniques, said nicks being found in the periphery of the heads of screws generally at the periphery in alignment with the positions of the wings of the cross recessed punch.

It is a further object of this invention to provide bumps or nibs in a first stage blow upset which are so arranged as to eliminate a tendency for the finally formed flat head screw to become square instead of circular, the latter being the desired design.

It is a further object of this invention to provide a central recess in the first blow upset of the head of the screw or like which also aids in predisposing material for making a good final product.

Also, it is an object of this invention to provide a method and apparatus for providing a uniform, smooth, circular flat headed screw, having a deep cross recess therein, where the head of the screw has a diameter which exceeds two and a half time the diameter of the shank, and where the area of the flat head adjacent the outer periphery is relatively thin, in a fast repetitive manner free from defects.

Novel features that are characteristic of the invention are set forth with particularity in the appended claims. The invention itself, both as to its organization and its method of operation together with additional objects and advantages thereof, will best be understood by the following description of specific embodiments when read in connection with accompanying drawings in which:

Figure 1:
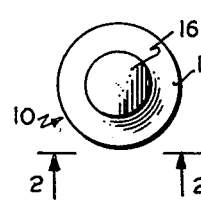
FIG. 1 is a top plan view of a first stage upset of a head on a screw blank as formed by conventional prior art techniques.
Figure 2:
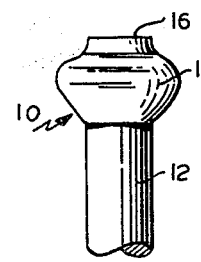
FIG. 2 is a side elevational view of the head shown in FIG. 1, said view being taken along lines 2—2 of FIG. 1.
Figure 3:
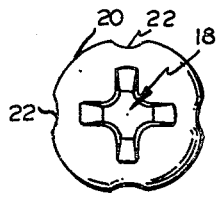
FIG. 3 is a top plan view of the head as finally formed from the first stage upset shown in FIGS. 1 and 2, the defects in the head being exaggerated for purposes of clarity.

It is usual to make a flat headed fastener such as a screw or bolt by upsetting the fastener blank (formed of wire stock) in two separate stages. FIGS. 1 and 2 show the prior art first stage upset 10 on the end of the fastener blank 12 to provide a bulbous portion 14 having a short extension 16 at the extreme top. FIG. 3 shows the fastener head after it has been finally formed with a cross recess 18 after the first stage upset 10 has been engaged by a suitable second stage punch die. The defects that occur in the finally formed article as shown in FIG. 3 have been exaggerated for purposes of clarity in discussion. As a cross recess punch descends on the first stage upset 10 of FIGS. 1 and 2, the cross recess finish punch tends to draw in material from portion 16 and portion 14 so as to give a periphery 20 which is somewhat square shaped and often leaves nicks 22 in the periphery 20, said nicks 22 being in alignment with the wings of the cross recess 18. In making a flat headed fastener where the diameter of the finished head portion greatly exceeds the diameter of the wire stock, for example, in excess of two and one half times the diameter, these defects such as the irregular periphery with nicks 22 therein become more and more noticeable. For many applications this irregularity in the head is not of grave concern. However, in the application of fasteners such as screws and the like to Gypsum wall board, these irregularities of the head have a great tendency to tear the paper during rotation of the fastener since the head must be disposed below the plane of the board.

Figure 13:
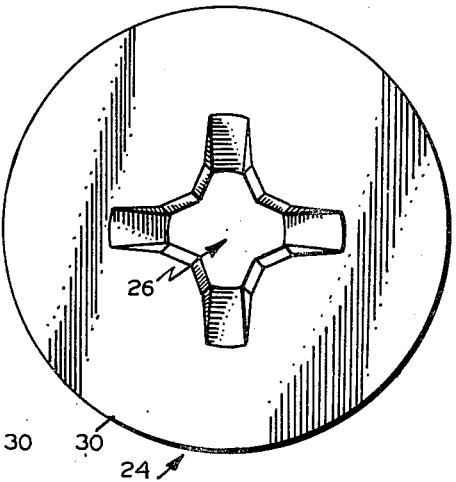
FIG. 13 is a top plan view of the finished head of the fastener formed by the punch and die shown in FIG. 11.
Figure 14:
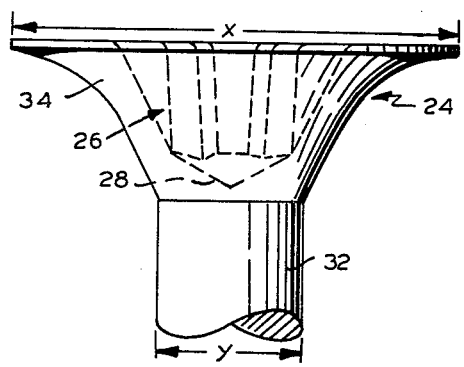
FIG. 14 is a side elevational view of the fastener head shown in FIG. 13 and formed in accordance with the principles of this invention.

This invention is concerned with the forming of a fastener head 24 which is generally designated as a flat head having a cross recess 26 therein, the fastener head 24 having a diameter X which exceeds the diameter Y of the wire stock 32 by a factor of more than two and one half. As shown in FIG. 14 it will be noted that the cross recess 26 is quite deep relative to the axial height of the head, the lowest point 28 being almost as deep as the entire axial height of the head portion. Stated another way, the cross recess 26 is relatively large in comparison to the over-all size of the head portion 24. The periphery 30 of the head is circular, the radially outer portion 34 of the head 24 is relatively thin, and the problem is to obtain the configurations of heads such as shown in FIGS. 13 and 14 in a uniform reproducible manner with high speed machinery. It is of course apparent that FIGS. 13 and 14 show a fastener head 24 free of the defects which are shown in FIG. 3.

In order to obtain the fasteners such as shown in FIGS. 13 and 14, I have found it necessary and desirable to alter the shape of the first stage upset.

Figure 8:
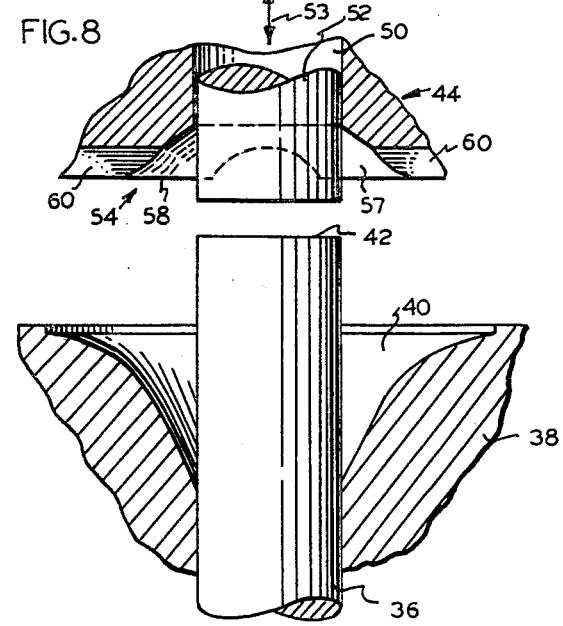
FIG. 8 is a view, partially in section, showing a portion of the die in FIG. 7 aligned with a piece of wire stock and a second die prior to the first stage upset of the end of the wire stock.
Figure 9:
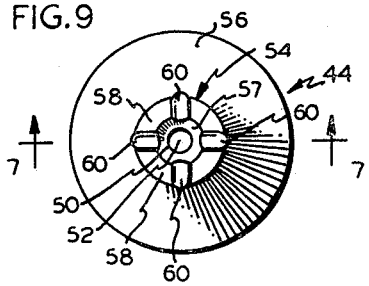
FIG. 9 is an end view of the die shown in FIG. 7 along lines 9—9 of FIG. 7.
Figure 10:
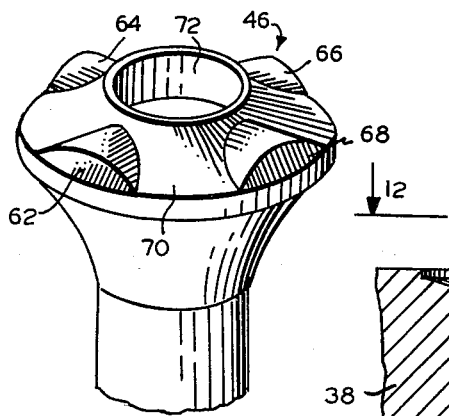
FIG. 10 is a perspective view of the preferred first stage upset made by the dies shown in FIGS. 7, 8 and 9.

The means for imparting the special first stage upset of the head is shown in FIG. 8. Wire stock 36 of predetermined diameter is fed into a first die means 38 having an open cavity 40. The cavity 40 has a shape corresponding to the shape of the underside of the head 24 that is to be finally formed. The stock 36 is fed into the lower die 38 in a manner such that the end surface 42 extends above the top surface of the lower die 38 as shown in FIG. 8. A special first stage upsetting die 44 is then brought into contact with the wire stock 36 as shall be explained. The second die means 44 is configured to provide a first blow upset on the wire stock which gives an upset shape 46 as shown in FIG. 10, alternate first stage shapes being shown in FIGS. 4, 5 and 6.

Figure 7:
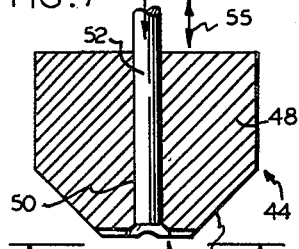
FIG. 7 is a sectional view along lines 7—7 of FIG. 9 of a die means for imparting the configuration in the first blow upset as shown in FIG. 10.

The die means 44 has a body portion 48 having a through central bore 50 which has a slideable insert 52 therein. The die means 44 may be formed of ordinary cold header steel, high carbon-high chrome steel, or a heading grade of carbide depending upon the number of pieces expected to be produced in the dies. The insert 52 is relatively movable by means 53 (shown semidiagrammatically by an arrow) to the body portion 48 and the body portion 48 is relatively movable by means 55 (shown semidiagrammatically by another arrow) to the die means 38. The lower end of the second die means 44 as shown in FIG. 7 has a working face 54 which is relieved by an outer conical portion or nose portion 56. The working face 54 is formed with a conical recess 57 which is concentric with bore 50 which opens onto a transverse face 58. The face 58 is substantially normal to the axis of the bore 50. Thus the face 58 is defined by the relieved portion 56 and the conical recess 57. The face 58 is in the form of an annulus, the annulus being interrupted substantially on the quadrant lines thereof by four grooves 60 each of which have a circular segment cross section substantially of a height equal to ½ the radius. It will be noted that the grooves 60 are substantially normal to the axis of the bore 50 and each groove intersects the conical recess 57 and the relieved nose portion surface 56.

Figure 11:
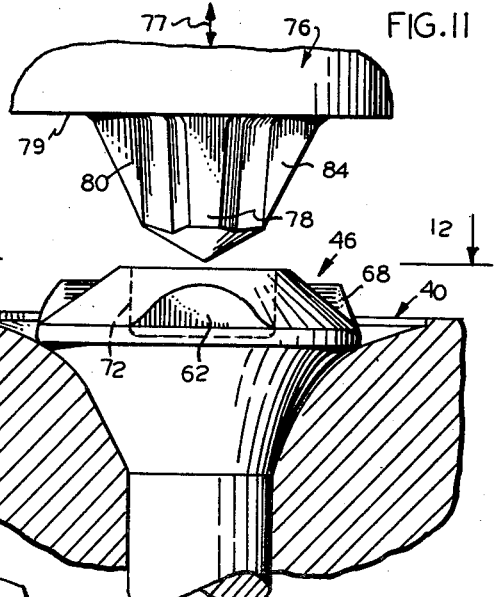
FIG. 11 is a view, similar in many respects to FIG. 8, showing the parts just prior to the second blow by a cross recess punch.

As the die means 44 closes relative to the die means 38, the insert 52 is recessed from the position shown in FIG. 8. The end 42 of the wire stock 36 enters bore 50. As the die means 44 closes, the insert 52 moves in the bore 50 and engages the portion 42 to form the end of the wire stock into a configuration such as shown in FIG. 10. It will be noted that the largest diameter of the conical recess 57 (at the point of intersection with surface 58) is less than the largest diameter of the recess 40 in die means 38. The upset head 46 formed in the first stage of the heading operation is formed with four lugs 62, 64, 66 and 68 corresponding to the grooves 60 in the die means 44. A sloping portion 70 is formed by and is complementary to the recess 57 and a central recess 72 is formed in upset 46 by moving the insert 52 downwardly into the end 42, said recess 72 being best depicted in FIG. 10. The diameter of the upset portion 46 is smaller than the diameter of the recess 40 as best shown in FIG. 11.

Figure 4:
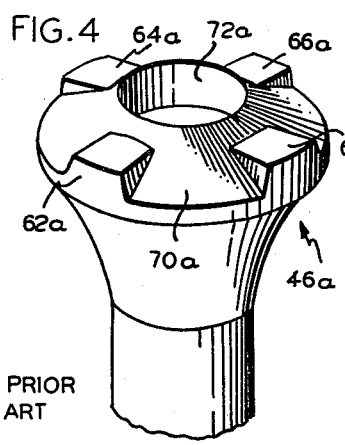
FIGS. 4, 5 and 6 are perspective views showing various forms of first stage upsets in accordance with the concepts of the instant invention.
Figure 5:
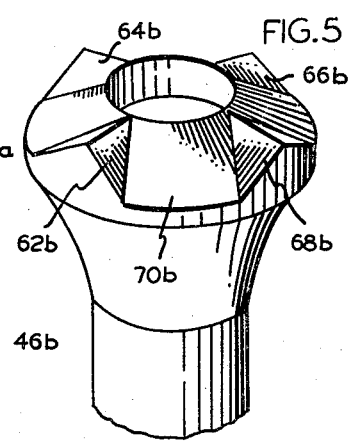

The first stage upset dies utilized to form the upset head 46 may be of different configuration from that shown in FIGS. 7 and 8. This may be intuitively perceived by viewing FIGS. 4 and 5 which show different embodiments 46a and 46b respectively of upset heads. The embodiments 46a and 46b are substantially similar to the preferred embodiment 46 described earlier and similar reference numerals will be used to identify similar parts with the addition respectively of the suffixes "a" and "b." As can be seen in FIG. 4, the grooves (corresponding to 60) in the die means (corresponding to 44) are rectilinear, rather than circular segment in shape, producing rectilinear lugs 62a, 64a, 66a, and 68a. The lugs 62a–68a are slightly harder to form than the lugs 62–68 due to difficulties in completely filling out the relatively sharp corners thereof, but the lugs contain essentially the same volume of material as the lugs 62 to 68 aforediscussed. In all other respects the first stage upset head 46a is substantially identical to the head 46 shown in FIG. 10.

The first stage upset head 46b is substantially similar except that the lugs 62b to 68b are triangular in shape. Thus, the grooves (corresponding to 60) in the face of the die means (corresponding to 44) would have a triangular shape in cross section. It will be noted that the lugs 62b have a somewhat larger axial extent but are formed so that they have substantially identical volumes to the lugs or nibs 62 to 68.

Figure 6:
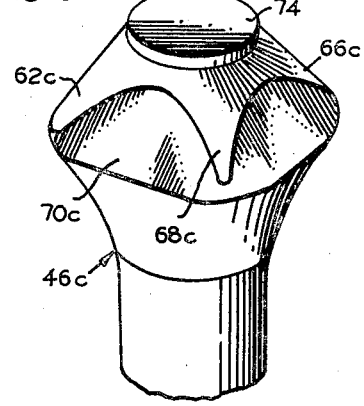

The upset head 46c shown in FIG. 6 is substantially similar to those aforediscussed and similar parts will be given similar reference numerals together with the suffix "c." The first stage upset head 46c is formed with four lugs 62c–68c and instead of a central recess 72 has a short axial extension 74. The volume of the lugs 62c to 68c together with the extra material in extension 74, as differentiated from the embodiments shown in FIGS. 4, 5 and 10, contain the same amount of material due to the scalloped relationship of portion 70c intermediate the lugs. This configuration predisposed the fastener material to produce the desired finished head in the finish blow.

Figure 12:
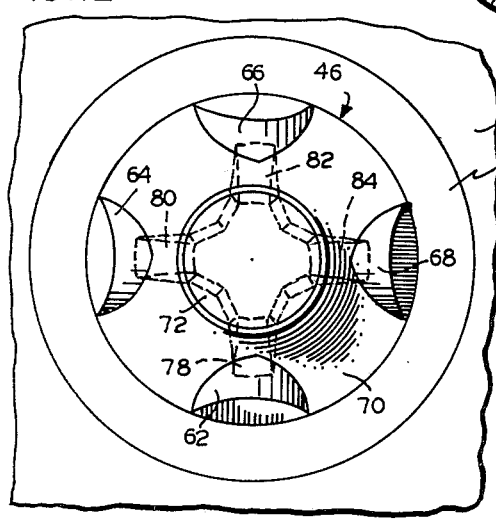
FIG. 12 is a top plan view of the parts taken along lines 12—12 of FIG. 11, the alignment of the punch of FIG. 11 being shown in dotted lines.

After the first stage upset 46 is formed by die means 44, a third die means in the form of punch means 76 operated by means 77 (shown diagrammatically by arrow) is brought into engagement with the head 46 while it is still in the die means 38. The third die means 76, sometimes referred to as the punch, is adapted to form the relatively large cross recess 26 in the head of the screw and to simultaneously finish form the head 24 of the fastener. The punch 76 is formed with a flat surface 79 which is transverse to the axis of the fastener blank stock 36 and with a plurality of depending wings 78, 80, 82 and 84. As the punch 76 is relatively moved to the die means 38 containing the first stage upset 46, the wings 78 through 84 are aligned with the lugs 62, 64, 66 and 68 as shown in FIG. 12. When the punch 76 closes relative to the die 38 the head 24 is formed. As will be perceived a complex extruding and "pulling in" or "sucking" action takes place in the final stage of heading. The presence of the lugs 62 through 68 as shown, provides material to compensate for the "drawing in" or "sucking in" of material by the punch wings 78–84 in forming recess 26, and also provides enough material for filling out the periphery of the head 24 in a uniform manner. The exact volume of the lugs 62 through 68 must be varied in accordance with the speed of relative movement of the punch means 76 to die means 38, other conditions being identical. For example, the lugs 62 to 68 must be considerably larger in volume if the punch closes at a rate of 200 times a minute as contrasted with closing at the rate of 10 times a minute. The reason for this, it is believed, is that as the punch wings descend into the material of upset 46 at a relatively fast rate, there is a greater tendency for material to be drawn into the recess 26 due to surface friction, there being relatively smaller amount of displacing action of the wings relative to filling die cavity 40. On the other hand, when the punch moves at a relatively slow speed, there is a tendency for a spreading action to minimize the "pulling in" or "sucking" action of the material caused by the penetration of the punch wings and, thus, a lesser amount of material is required in the lugs, approaching first upset shape 10 shown as the prior art to fill out the cavity 40.

The presence of the shallow cavity 72 in the upset head 46 also aids in predisposing the material for accurate filling out of the cavity 40 in the die 38. While this is not absolutely necessary as shown by the embodiment in FIG. 6, it does have the advantage of providing a wider first upset to facilitate moving the material of upset 46 more easily and uniformly in forming the cross recess and in simultaneously filling out the cavity 40.

The formation of circular segment lugs 62–68 have the advantage that the shaping of the die 44 is relatively easy. It has been found that the tool or die 44 stands up well in commercial production and has a relatively long tool life. The finished head parts formed by the instant process and apparatus provide a flat headed fastener with a high degree of uniformity and circularity and are singularly free of the nicks which are formed by the prior art process.

Although the specific embodiments of the invention have been shown and described, it is with full awareness that many modifications thereof are possible. The invention, therefore, is not to be restricted except insofar as is necessitated by the prior art and by the spirit of the appended claims.

What is claimed as the invention is:

1. The method of cold heading wire stock to provide a flat headed fastener having a deep cross-recess in the head, said head having a substantially circular periphery in excess of two and one-half times the diameter of said wire stock comprising the stages of:
   (a) Placing the wire stock into female die means in a manner so that the end portion of the wire stock protrudes beyond the wall surface of said female die means;
   (b) Moving first stage upsetting die means to a closed position relative to said female die means with said upsetting die means having a relatively movable central portion relative to said female die means, said first stage upsetting die means having a bore for receipt of the end of said wire stock which also serves as a slide for the relatively movable portion thereof;
   (c) Moving said relatively movable portion of said first stage upsetting die means into engagement with the end of said wire stock to upset same in a manner to cause the flow of metal outwardly and upwardly in a controlled fashion into the cavity formed by the female die means and the first stage upsetting complementary die means, whereby symmetrical lug portions are formed on the fastener head which extend axially beyond the plane of the ultimate terminal portion of the screw head to be formed with a recess provided in the center of said head and surrounded by said symmetrical lug portions;
   (d) Aligning of finished die punch means having wing portions thereon with said female die means containing said wire stock with said first stage upset head in a manner such that the wings of said punch die means are oriented relative to and aligned with the lugs in said first stage of upset head and the center of said punch aligned with the aperture in said first stage upset head to facilitate the guiding of the punch die means;
   (e) Moving the punch die means into engagement with said upset first stage head so that the wings of the punch die means simultaneously pulls material from the lugs of said first stage upset into the recess formed thereby and simultaneously extrudes the first stage upset head in a manner to fill out the circular periphery of the female die means to provide a flat headed fastener having a deep cross-recess therein and a substantially circular periphery which exceeds two and one-half times the diameter of the wire stock with an outer head configuration that presents in cross-section a flaring configuration relative to the axis from the vicinity of the shank portion of the fastener in a direction toward the flat head of the fastener and ultimately presents in the vicinity of the outer circular periphery of the screw head a substantially horizontal surface.

2. A die means for imparting a special shape to a first blow upset in a cold heading operation comprising body means having a central through-bore of predetermined diameter and a working face substantially transverse to the axis of said bore, walls defining a generally conical recess surrounding said bore and intersecting said working face, groove means generally transverse to the axis of said bore and opening into said conical recess, said groove means being adapted to provide symmetrical lugs in the configuration of a cross in a first stage upset of wire stock in a cold heading operation, which lugs project substantially beyond the ultimate plane of the head of the product to be formed in subsequent operations and provide material in a configuration to enhance the flow of material radially outwardly for a distance at least two and one-half times the diameter of the predetermined diameter of the bore, cooperable die means in opposed relation to said body means having the central bore provided with a generally conical configuration adapted to be closed against the working face of said body means to provide a closed cavity, said last mentioned die means adapted to provide a desired configuration to a surface of the product to be formed, and punch means movable in said central bore of said body means to a position beyond the generally conical recess provided with said grooves to insure the flow of metal into said groove means and to provide a central recess in the product formed in said first stage upset.

3. The die means set forth in claim 2 wherein the groove means has a cross sectional shape essentially rectilinear in configuration.

4. The die means set forth in claim 2 wherein the groove means has a cross sectional shape which is essentially triangular in character.

References Cited by the Examiner
UNITED STATES PATENTS

| | | | |
|---|---|---|---|
| 389,167 | 9/88 | Rogers | 10—7 |
| 438,938 | 10/90 | Nettleford | 10—27 |
| 2,165,424 | 7/39 | Tomalis | 10—24 |
| 2,832,970 | 5/58 | Carlson | 10—26 |

OTHER REFERENCES

Linsley Article—American Machinist, April 8, 1948 (pages 101-2 only of pages 99-110 relied on). Copy in 10-27, Group 340.

ANDREW R. JUHASZ, *Primary Examiner*.